UNITED STATES PATENT OFFICE.

WILLIAM G. LINDSAY, OF NEWARK, NEW JERSEY, ASSIGNOR TO THE CELLULOID COMPANY, A CORPORATION OF NEW JERSEY.

COMPOUND OF ACETYL CELLULOSE AND PROCESS OF MAKING THE SAME.

1,199,799.

Specification of Letters Patent.

Patented Oct. 3, 1916.

No Drawing. Application filed January 29, 1914. Serial No. 815,110.

*To all whom it may concern:*

Be it known that I, WILLIAM G. LINDSAY, a citizen of the United States, residing at Newark, in the county of Essex and State of New Jersey, have invented a certain new and useful Compound of Acetyl Cellulose and Process for Making the Same, of which the following is a full, clear, and exact specification.

The invention is especially useful in its application to films for photographic purposes, although such application may be extended to the so-called solid compounds.

The object of the invention is to impart permanent flexibility and toughness of a high degree to products resulting from the admixture of an organic derivative of cellulose such as acetyl cellulose with various solvents therefor. In fact, use of such alcohols in conjunction with the usual solvents not only increases the flexibility and elasticity, but the tensile strength as well. I have discovered that by the use of the liquid monohydroxy aliphatic alcohols having more than two carbon atoms, the characteristics of durability, toughness and flexibility are imparted to the film. These characteristics are not attained by the use of ethyl or methyl alcohol.

As a mixture of the alcohols herein referred to, the ordinary fusel oil of commerce is a good example. I have found that the ordinary commercial fusel oil imparts to the acetyl cellulose mixtures herein described the peculiar and valuable properties claimed by this invention. Also, when the ordinary commercial grade of fusel oil is subjected to fractional distillation, I find that the different fractions, either alone or mixed in varying proportions, impart a certain degree of flexibility and elasticity to the finished product.

In order to carry out my invention I may proceed as follows: In making a flowable solution for films or varnishes or other similar purposes, I take one hundred (100) parts of acetyl cellulose by weight and to this acetyl cellulose dissolved in a suitable solvent, such, for example, as a mixture of ethylene chlorid and alcohol, I add from ten (10) to forty (40) parts of a solid such as camphor, triphenyl phosphate, paratoluol-sulfonamid, or the like, and from five (5) to thirty (30) parts of one or more of the alcohols herein specified, as above described. The solvent for the acetyl cellulose should also act as a solvent for the other specified ingredients. The solution or mixture thus produced, if intended for the manufacture of films, is then spread upon a suitable surface such as a glass plate or polished metal support and the excess of solvent allowed to evaporate according to the means and practice well known to the art. The choice of the acetyl cellulose depends upon the result to be obtained, as I have found in practice that by incorporating the alcohols herein specified by means of a suitable solvent, beneficial results are obtained with practically all varieties. However, I prefer that variety of acetyl cellulose which is plastic in chloroform and insoluble in acetone, although I may use with satisfactory results that variety of acetyl cellulose which is plastic in chloroform and also soluble in acetone to the extent of producing a flowable solution.

In my United States Patent No. 1,027,616 I disclosed the use of ethylene chlorid in combination with ethyl or methyl alcohol, and I find that to such a mixture in which acetyl cellulose has been dissolved, the addition of the alcohols herein specified imparts to the product permanent toughness and flexibility of a high degree. Such a combination is particularly well adapted for the production of plastic masses.

What I claim and desire to secure by Letters Patent is:—

1. A composition of matter containing acetyl cellulose and a liquid monohydroxy aliphatic alcohol having more than two carbon atoms.

2. A composition of matter containing an acetyl cellulose and triphenyl phosphate, obtained by dissolving the same in a common solvent, and a liquid mono-hydroxy aliphatic alcohol having more than two carbon atoms.

3. A composition of matter containing an acetyl cellulose, approximately 100 parts, triphenyl phosphate, approximately 10 to 40 parts, obtained by dissolving the same in a common solvent, and from 5 to 30 parts of a liquid mono-hydroxy aliphatic alcohol having more than two carbon atoms.

4. A composition of matter containing an acetyl cellulose plastic in chloroform and triphenyl phosphate, obtained by dissolving the same in a common solvent, and a liquid mono-hydroxy aliphatic alcohol having more than two carbon atoms.

5. A composition of matter containing an acetyl cellulose plastic in chloroform, a liquid monohydroxy aliphatic alcohol having more than two carbon atoms, and a solvent.

6. A composition of matter containing an acetyl cellulose and a non-inflammable material obtained by dissolving the same in a common solvent to which has been added a liquid mono-hydroxy aliphatic alcohol having more than two carbon atoms.

7. A composition of matter containing an acetyl cellulose plastic in chloroform and a non-inflammable material obtained by dissolving the same in a common solvent and a liquid mono-hydroxy aliphatic alcohol having more than two carbon atoms.

8. A composition of matter containing an organic derivative of cellulose and a non-inflammable material obtained by dissolving the same in a solvent mixture of a chlorinated hydrocarbon and an aliphatic alcohol, and a liquid for imparting permanent toughness and flexibility to the composition.

9. A composition of matter containing an organic derivative of cellulose and a non-inflammable material obtained by dissolving the same in a solvent mixture of a chlorinated hydrocarbon and an aliphatic alcohol, and a liquid mono-hydroxy aliphatic alcohol having more than two carbon atoms.

10. A composition of matter containing an organic derivative of cellulose and a non-inflammable material obtained by dissolving the same in a solvent mixture of a chlorinated hydrocarbon and an aliphatic alcohol, and fusel oil.

11. A composition of matter containing an organic derivative of cellulose and triphenyl phosphate, obtained by dissolving the same in a solvent mixture of a chlorinated hydrocarbon and an aliphatic alcohol, and a liquid for imparting toughness and flexibility to the product.

12. A composition of matter containing an organic derivative of cellulose and triphenyl phosphate obtained by dissolving the same in a solvent mixture of a chlorinated hydrocarbon and an aliphatic alcohol, and a liquid mono-hydroxy aliphatic alcohol, having more than two carbon atoms.

13. A composition of matter containing an organic derivative of cellulose and triphenyl phosphate obtained by dissolving the same in a solvent mixture of a chlorinated hydrocarbon and an aliphatic alcohol, solvent, and fusel oil.

14. A composition of matter containing acetyl cellulose and triphenyl phosphate obtained by dissolving the same in a solvent mixture of a chlorinated hydrocarbon and an aliphatic alcohol, and fusel oil.

15. The process which consists in dissolving an acetyl cellulose in a solvent to which has been added a liquid mono-hydroxy alcohol having more than two carbon atoms, and drying the same.

16. The process which consists in dissolving an acetyl cellulose and a non-inflammable material in a common solvent to which has been added a liquid mono-hydroxy alcohol having more than two carbon atoms, and drying the same.

17. The process of making a composition of matter, which consists in dissolving an acetyl cellulose and triphenyl phosphate in a common solvent, adding a liquid mono-hydroxy alcohol having more than two carbon atoms, and drying the same.

18. The process of making a composition of matter, which consists in dissolving an acetyl cellulose plastic in chloroform and triphenyl phosphate in a common solvent, adding a liquid mono-hydroxy alcohol having more than two carbon atoms, and drying the same.

19. The process of making a composition of matter, which consists in dissolving an acetyl cellulose and a liquid mono-hydroxy aliphatic alcohol having more than two carbon atoms in a solvent, spreading such solution upon a suitable surface and permitting the excess of solvent to evaporate.

20. The process of making a composition of matter, which consists in dissolving an acetyl cellulose, a liquid mono-hydroxy aliphatic alcohol having more than two carbon atoms in a solvent, spreading the solution upon a suitable surface and permitting the excess of solvent to evaporate.

In testimony whereof I affix my signature, in presence of two witnesses.

WILLIAM G. LINDSAY.

Witnesses:
C. V. EDWARDS,
G. N. KERR.

Corrections in Letters Patent No. 1,199,799.

It is hereby certified that in Letters Patent No. 1,199,799, granted October 3, 1916, upon the application of William G. Lindsay, of Newark, New Jersey, for an improvement in "Compounds of Acetyl Cellulose and Processes of Making the Same," errors appear in the printed specification requiring correction as follows: Page 1, line 19, after the period insert the sentence—

*I have discovered that the liquid mono-hydroxy aliphatic alcohols having more than two carbon atoms, such as propyl, butyl, amyl, &c., alone and in various admixtures, have the property of imparting to such products a high degree of permanent toughness, flexibility and elasticity without impairing the other desirable characteristics.;*

Page 2, line 59, claim 13, cancel the word "solvent"; and that the said Letters Patent should be read with these corrections therein that the same may conform to the record of the case in the Patent Office.

Signed and sealed this 31st day of October, A. D., 1916.

[SEAL.]                                R. F. WHITEHEAD,
Cl. 106—40.                          *Acting Commissioner of Patents.*